United States Patent
Grunewald Mayer et al.

(10) Patent No.: US 11,691,703 B2
(45) Date of Patent: Jul. 4, 2023

(54) METHOD, DEVICE AND APPARATUS FOR AUTONOMOUS DOCKING OF MARINE VESSEL

(71) Applicant: WÄRTSILÄ VOYAGE GMBH, Hamburg (DE)

(72) Inventors: Jann-Timothy Grunewald Mayer, Hamburg (DE); Karl Soderstjerna, Hamburg (DE)

(73) Assignee: WÄRTSILÄ VOYAGE GMBH, Hamburg (DE)

( * ) Notice: Subject to any disclaimer, the term of this patent is extended or adjusted under 35 U.S.C. 154(b) by 400 days.

(21) Appl. No.: 17/059,852

(22) PCT Filed: Jun. 1, 2018

(86) PCT No.: PCT/US2018/035586
§ 371 (c)(1),
(2) Date: Nov. 30, 2020

(87) PCT Pub. No.: WO2019/231464
PCT Pub. Date: Dec. 5, 2019

(65) Prior Publication Data
US 2021/0221485 A1    Jul. 22, 2021

(51) Int. Cl.
*B63B 79/40* (2020.01)
*G05D 1/02* (2020.01)
*G08G 3/02* (2006.01)

(52) U.S. Cl.
CPC .......... *B63B 79/40* (2020.01); *G05D 1/0206* (2013.01); *G08G 3/02* (2013.01); *B63B 2213/02* (2013.01)

(58) Field of Classification Search
CPC ..... B63B 79/40; B63B 2213/02; B63B 49/00; B63B 79/10; G05D 1/0206; G05D 1/0088; G08G 3/02; B63H 25/04
See application file for complete search history.

(56) References Cited

U.S. PATENT DOCUMENTS

2015/0089427 A1*  3/2015  Akuzawa ............. G05D 1/0206
                                                       715/771

FOREIGN PATENT DOCUMENTS

EP         3214523 A1      9/2017
WO    2016145398 A1      9/2016

OTHER PUBLICATIONS

PCT, International Search Report, Application No. PCT/US2018/035586, dated Feb. 18, 2019, 3 pages.
(Continued)

*Primary Examiner* — Yuen Wong
(74) *Attorney, Agent, or Firm* — Ziegler IP Law Group

(57) ABSTRACT

Apparatus and computer-implemented method for autonomous marine vessel docking, the method including determining a transit control mode associated with route plan data defining transit operation between ports; determining an autonomous docking control mode associated with harbor track data including a set of waypoint properties and defining approach zone information and track segments joined at waypoints. Method further includes determining vessel location, speed and heading; comparing the vessel location, speed and heading to the approach zone information and changing from the transit control mode to the autonomous docking control mode in response to: the vessel location included by the location area information; the vessel speed being lower than the maximum vessel speed for entering the approach zone; and the vessel heading matching criteria defined by the maximum heading deviation for entering the approach zone.

20 Claims, 5 Drawing Sheets

(56) References Cited

OTHER PUBLICATIONS

PCT, Written Opinion of the International Searching Authority, Application No. PCT/US2018/035586, dated Feb. 18, 2019, 9 pages.

* cited by examiner

METHOD, DEVICE AND APPARATUS FOR AUTONOMOUS DOCKING OF MARINE VESSEL

TECHNICAL FIELD

The present application generally relates to autonomous vessel maneuvering method, device and apparatus.

BACKGROUND

This section illustrates useful background information without admission of any technique described herein representative of the state of the art.

The present disclosure relates to Automated Vessel Maneuvering System (AVMS) that is to provide automated vessel maneuvering including automated docking and undocking.

Dynamic positioning (DP) is known. It involves automatic or semi-automatic control of a marine vessel's position and heading by using its own propellers and thrusters with respect to one or more position references. Typically, the intention is to keep the vessel's position fixed within given parameters. Dynamic positioning (DP) is utilized e.g. in offshore drilling operations, for example.

Autopilots are also known. The autopilot (also known as self-steering) is an automatic device or system that guides or maintains a marine vessel's chosen course so that constant 'hands-on' control by a human operator is not necessarily required.

Automatic radar plotting aid is also known. That can be utilized in calculating a tracked object's course, speed and closest point of approach to detect if there is a danger of collision with another ship or landmass, for example.

However, autonomous marine vessel maneuvering from transit to docking in safe and efficient way is still needed.

Thus, a solution is needed to enable accurate, efficient, and reliable method for autonomous docking and undocking.

SUMMARY

Various aspects of examples of the disclosed embodiments are set out in the claims.

According to a first example aspect of the present disclosure, there is provided a computer-implemented method for autonomous marine vessel docking, the method comprising:
  determining a transit control mode associated with route plan data defining transit operation between ports;
  determining an autonomous docking control mode associated with harbor track data comprising a set of waypoint properties and defining approach zone information and track segments joined at waypoints, wherein the approach zone information comprises:
    location area information for the approach zone;
    maximum vessel speed for entering the approach zone; and
    maximum heading deviation for entering the approach zone;
  determining vessel location, speed and heading;
  comparing the vessel location, speed and heading to the approach zone information and changing from the transit control mode to the autonomous docking control mode in response to:
    the vessel location comprised by the location area information;
    the vessel speed being lower than the maximum vessel speed for entering the approach zone; and
    the vessel heading matching criteria defined by the maximum heading deviation for entering the approach zone.

In an embodiment, the method further comprises determining a dynamic setpoint based on the waypoint properties, wherein the dynamic setpoint comprising a setpoint position, a setpoint speed and a setpoint heading that change based on the harbor track data.

In an embodiment, the method further comprises:
  determining difference information between the dynamic setpoint and the determined vessel location using a closed loop controller;
  determining a force vector based on the difference information; and
  controlling thruster commands of the autonomous docking control mode based on the force vector.

In an embodiment, the method further comprises:
  aligning the vessel heading to the setpoint heading and the vessel speed to the setpoint speed, wherein the setpoint heading and the setpoint speed are configurable parameters.

In an embodiment, the method further comprises:
  interpolating the setpoint heading and the setpoint speed between waypoints and respective setpoint values based on the marine vessel's location on the track segment; and
  aligning the vessel heading to the interpolated setpoint heading and the vessel speed to the interpolated setpoint speed.

In an embodiment, interpolating is enabled based on a waypoint property of the waypoint to which the marine vessel is heading.

In an embodiment, the method further comprises:
  defining a lower speed threshold and a higher speed threshold; and
  determining sway control information based on the dynamic setpoint and the determined vessel location.

In an embodiment, the method further comprises:
  controlling, in a low speed mode, sway controlling thruster commands of at least one thruster of the marine vessel based on the sway control information by activating full scale three axis position and heading control by allocating full scale thrust to the at least one thruster of the marine vessel, when the marine vessel speed being less than the lower speed threshold.

In an embodiment, the method further comprises:
  disabling, in a high-speed mode, sway controlling thruster commands of at least one thruster of the marine vessel when the marine vessel speed being greater than the higher speed threshold.

In an embodiment, the method further comprises:
  controlling, in an intermediate speed mode, sway controlling thruster commands of at least one thruster of the marine vessel based on the sway control information by activating partial scale three axis position and heading control by allocating partial scale thrust to the at least one thruster of the marine vessel, when the marine vessel speed being between the lower and higher speed threshold.

In an embodiment, the partial scale is smaller than the full scale.

In an embodiment, in the intermediate speed mode, the partial scale is gradually changed between zero and the full scale with respect to the marine vessel speed.

In an embodiment, in the intermediate speed mode, the partial scale is gradually increased from zero to the full scale with respect to the marine vessel speed decreasing from the higher speed threshold to the lower speed threshold.

In an embodiment, the method further comprises:

maintaining the harbor track data for a port of call and a berthing position within the port, wherein the harbor track data comprises:
approach corridor data defining bounds on maximum track position deviation allowed during harbor maneuvering; and
the approach zone information.

In an embodiment, the approach zone information further comprises maximum lateral deviation for entering the approach zone, and the method further comprises:
comparing the vessel location, speed and heading to the approach zone information and changing from the transit control mode to the autonomous docking control mode in response to:
the vessel deviation is less than the maximum lateral deviation for entering the approach zone.

In an embodiment, the method further comprises:
determining entry leg data in response to changing to the autonomous docking control mode, wherein the entry leg data is configured to guide the marine vessel onto a harbor track defined by the harbor track data.

In an embodiment, in the transit control mode the marine vessel is configured to be at least partially in manual control mode.

In an embodiment, the method further comprises:
determining alignment of the marine vessel in view of a harbor track using the harbor track data; and
selecting sail direction based on the determined alignment.

According to a second example aspect of the present disclosure, there is provided a marine vessel apparatus for autonomous docking, comprising:
at least one sensor:
a communication interface for transceiving data;
at least one processor; and
at least one memory including computer program code;
the at least one memory and the computer program code configured to, with the at least one processor, cause the apparatus to:
determine a transit control mode associated with route plan data defining transit operation between ports;
determine an autonomous docking control mode associated with harbor track data comprising a set of waypoint properties and defining approach zone information and track segments joined at waypoints, wherein the approach zone information comprises:
location area information for the approach zone;
maximum vessel speed for entering the approach zone; and
maximum heading deviation for entering the approach zone;
determine vessel location, speed and heading;
compare the vessel location, speed and heading to the approach zone information and changing from the transit control mode to the autonomous docking control mode in response to:
the vessel location comprised by the location area information;
the vessel speed being lower than the maximum vessel speed for entering the approach zone; and
the vessel heading matching criteria defined by the maximum heading deviation for entering the approach zone.

In an embodiment, the at least one sensor is configured to provide position related data or environment related data.

In an embodiment, the at least one sensor comprises at least one of the following:

a global navigation satellite system (GNSS) position sensor;
a docking sensor for providing relative positioning information relative to a berth;
a gyro compass sensor for providing heading information;
a motion reference unit (MRU) sensor for providing pitch and roll information; and
a wind sensor for providing wind speed and wind direction information.

In an embodiment, the at least one memory and the computer program code are further configured to, with the at least one processor, cause the apparatus to:
select the global navigation satellite system (GNSS) position sensor as positioning information source in a first set of the track segments; and
determine vessel distance to the berth and select the docking sensor as positioning information source in a second set of the track segments in response to the vessel distance being less than a pre-defined threshold.

In an embodiment, the at least one memory and the computer program code are further configured to, with the at least one processor, cause the apparatus to:
determine a dynamic setpoint based on the waypoint properties, wherein the dynamic setpoint comprising a setpoint position, setpoint speed and a setpoint heading that change based on the harbor track data.

In an embodiment, the at least one memory and the computer program code are further configured to, with the at least one processor, cause the apparatus to:
determine difference information between the dynamic setpoint and the determined vessel location using a closed loop controller;
determine a force vector based on the difference information; and
control thruster commands of the autonomous docking control mode based on the force vector.

In an embodiment, the apparatus further comprises:
at least one thruster; and
wherein the at least one memory and the computer program code are configured to, with the at least one processor, cause the apparatus to:
determine external force information;
combine the force vector with the external force information;
determine the thruster commands based on the combination; and
control the at least one thruster based on the thruster commands.

In an embodiment, the external force information comprises wind information.

In an embodiment, the apparatus further comprises:
a plurality of thrusters; and
wherein the at least one memory and the computer program code are further configured to, with the at least one processor, cause the apparatus to:
control full three axis position and heading by allocating thrust to the plurality of thrusters.

According to a third example aspect of the present disclosure, there is provided a computer program embodied on a computer readable medium comprising computer executable program code, which code, when executed by at least one processor of an apparatus, causes the apparatus to:
determine a transit control mode associated with route plan data defining transit operation between ports;
determine an autonomous docking control mode associated with harbor track data comprising a set of waypoint properties and defining approach zone information and track segments joined at waypoints, wherein the approach zone information comprises:
  location area information for the approach zone;
  maximum vessel speed for entering the approach zone;
  maximum heading deviation for entering the approach zone; and
  maximum lateral deviation for entering the approach zone;
  determine vessel location, speed and heading;
  compare the vessel location, speed and heading to the approach zone information and changing from the transit control mode to the autonomous docking control mode in response to:
    the vessel location comprised by the location area information;
    the vessel speed being lower than the maximum vessel speed for entering the approach zone; and
    the vessel heading matching criteria defined by the maximum heading deviation for entering the approach zone.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

In the following description, like numbers denote like elements.

Embodiments of the present disclosure relate to Automated Vessel Maneuvering System (AVMS) that is to provide automated vessel maneuvering including automated docking and undocking.

Building blocks such as sensor processing, guidance and control logic, thruster allocation etc. exist for autonomous vessel control. However, different embodiments disclosed show technical effects on areas of guidance, controls, sensor processing, estimation and thruster allocation, especially when docking or undocking autonomously.

Figure 1:
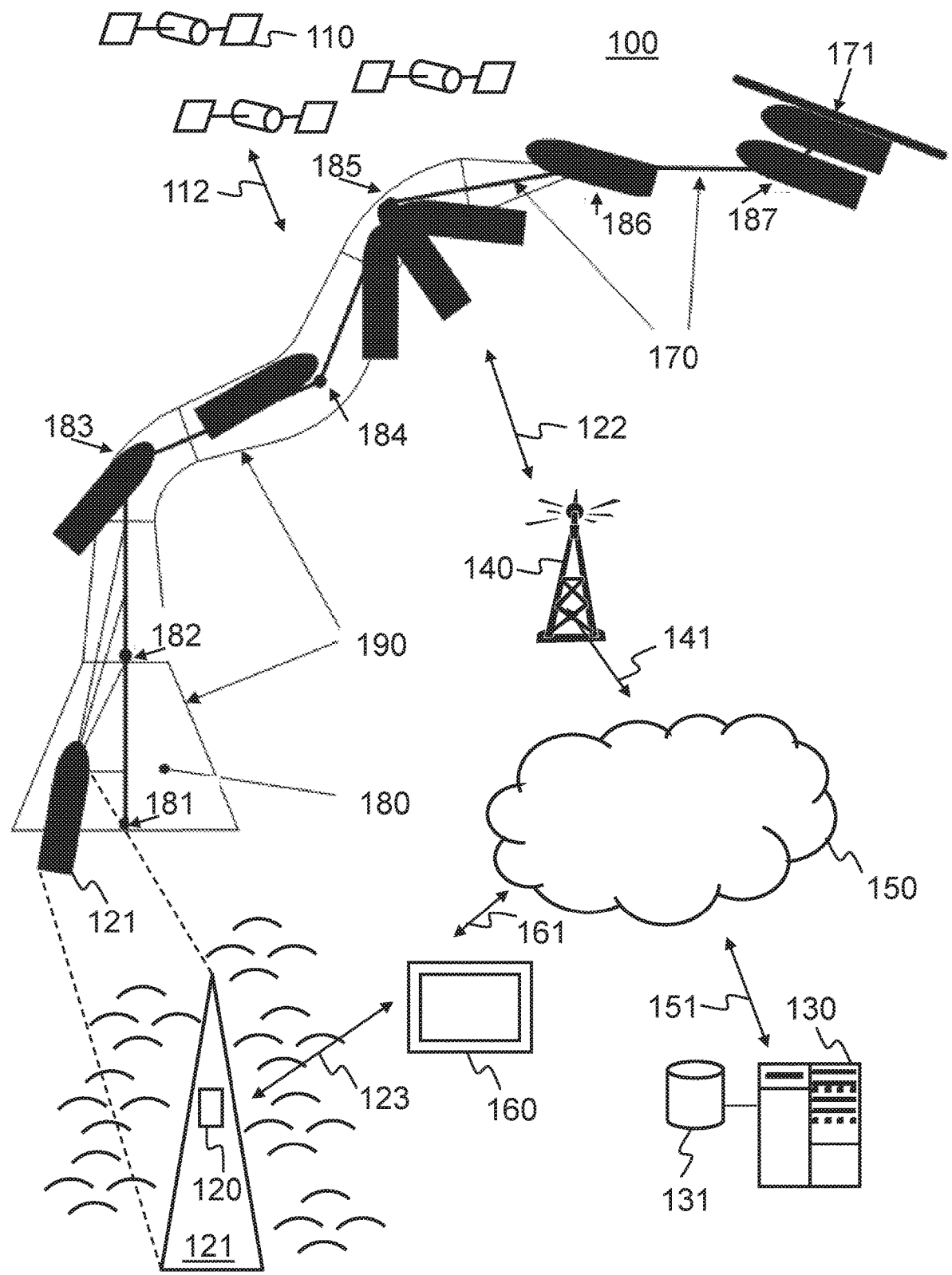
FIG. 1 shows a schematic picture of a system according to an example embodiment of the present disclosure.

FIG. 1 shows a schematic picture of a system 100 according to an example embodiment. A marine vessel 121 may comprise an apparatus 120 comprising means for generating, processing and transceiving vessel related data, for example. The apparatus 120 is capable of downloading and locally executing software program code. The software program code may be a client application of a service whose possible server application is running on a server apparatus 130, 131 of the system 100. The apparatus 120 may comprise a capturing device, such a sensor device, for providing vessel related signals and data. The sensor device may comprise an accelerometer, an inclinometer, a gyroscope, a wind sensor, a positioning sensor, a temperature sensor, a pressure sensor, or a camera, for example. The camera may also be used to provide video data and a microphone may be used for providing audio data, for example. The sensor device may also provide environmental signals and data.

In an embodiment, track follow capability of a marine vessel 121 may be provided by a High-Speed Track Follow mode (HSTF). In this mode, speed may be controlled manually while the heading is automatically controlled to maintain the vessel's lateral position relative to the track using rudders or steerable thrusters. This mode does not provide direct sway control and may therefore be only suited for medium to high speed where sway control can be achieved indirectly by controlling the heading setpoint for the yaw controller.

For low speed tracking, a Low Speed Track Follow mode (LSTF) may be provided, in which direct full three axis position and heading control is achieved by allocating thrust to all available thrusters.

In an embodiment, the High-Speed Track Follow (HSTF) mode may be configured to automatically control the vessel speed. The speed command is defined in the track data and the operator can adjust it up or down within limits if needed. The GNSS data may further be used to adjust the thrust command to follow the speed command.

In an embodiment, the Automated Vessel Maneuvering System (AVMS) includes a further mode, Automated Harbor Maneuvering (AHM), which expands on the Auto Position and LSTF modes to achieve precision maneuvers for docking and undocking.

Between ports, the system 100 will be able to follow routes using HSTF. However, during docking and undocking, the system 100 will operate in AHM mode to automatically follow and execute precise maneuvers along a "harbor track" 170. The harbor track 170 includes all the necessary information to maneuver the vessel 121 between the docked position and the HSTF route. If the environment or other constraints so require, the operator can choose between different harbor tracks 170. FIG. 1 provides a conceptual illustration of a vessel 121 following a harbor track 170 to its docked position 171.

In an embodiment, the Automated Vessel Maneuvering System (AVMS) is configured to enable automatic blending between LSTF and HSTF behavior. At intermediate speeds, the marine vessel 121 control may be a combination of the two, which provides a smooth transition and allows operation at any speed. For example, at low speeds, direct sway control is used. This control is gradually reduced as the marine vessel 121 accelerates such that there is no direct sway control at high speeds. Such functionality allows the Automated Vessel Maneuvering System (AVMS) to take the marine vessel 121 from high speeds in open water down to a stop at the dock 171.

The transit operation between ports, and the automated docking/undocking operation, may be performed using separate modes. Alternatively, they may be combined as a single mode.

Manual vessel control will involve using the thrust control levers to manually control vessel speed and heading. Automated vessel control will involve switching control of the vessel propulsion and steering to the AVMS. This may be accomplished through the use of a bridge installed mechanical two position switch within the vessel 121, with one position dedicated to "Manual" control and the other to "AVMS" control. Use of a switch ensures that control can always be restored to the thrust levers and conning.

In an embodiment, a lower speed threshold and a higher speed threshold may be defined and sway control information determined based on the dynamic setpoint and the determined vessel location. In a low speed mode, sway controlling thruster commands of at least one thruster of the marine vessel are controlled based on the sway control information by activating full scale three axis position and heading control by allocating full scale thrust to the at least one thruster of the marine vessel, when the marine vessel speed being less than the lower speed threshold. In a high-speed mode, sway controlling thruster commands of at least one thruster of the marine vessel are disabled when the marine vessel speed being greater than the higher speed threshold. In an intermediate speed mode, sway controlling thruster commands of at least one thruster of the marine vessel are controlled based on the sway control information by activating partial scale three axis position and heading control by allocating partial scale thrust to the at least one thruster of the marine vessel, when the marine vessel speed being between the lower and higher speed threshold. The partial scale is smaller than the full scale and the partial scale may be gradually changed between zero and the full scale with respect to the marine vessel speed. In the intermediate speed mode, the partial scale may be gradually increased from zero to the full scale with respect to the marine vessel speed decreasing from the higher speed threshold to the lower speed threshold, for example.

For vessel 121 transit and docking the AVMS may function in one of three possible states, for example: Standby, Docked and Sail.

When vessel 121 control is initially transferred to the AVMS the AVMS will be in the Standby state. In this state the thrusters are set to zero command allowing the operator to configure the system. The following operations may be available in Standby: Configure system parameters, Sensor selection, Harbor track selection, Thruster selection, Thruster checks (automated command/feedback test), and Monitoring, for example.

From the Standby state the AVMS may transition to either the Docked or Sail states depending on the requirements of a particular situation. The AVMS may switch back to the Standby state once docked, depending on the requirements for a particular berth.

In an embodiment, when the two-position switch is returned to the Manual position the AVMS will return to (or remain in) the Standby state, however in this case it will not have any control over the thrusters and steering (thruster checks will not function).

The Docked state covers the case where the AVMS is required to actively hold a vessel 121 in a docked position 171 for a period of time. In this state the AVMS may automatically (e.g. triggered by a "ramp down" signal) control the thrusters to hold the vessel 121 hard against a berth wall while loading and unloading operations take place.

Transition to the Docked state may also be performed manually since it needs to happen just prior to contacting the dock. The ramp may not be lowered until the marine vessel 121 is safe against the dock 171.

The Sail state includes all operations involving the following of a track 170 and the directives contained within one or more waypoints 181-187.

The AVMS is configured to support continuous automated vessel 121 operations involving transit and docking/undocking maneuvers. While the operation is automated some user input may be required, both for safety of operation and also to provide for operational variances. An example of this might be a transit operation where multiple tracks 170 exist due to various environmental conditions, or for docking operations where multiple berths are available. For example, a vessel 121 leaving from one port can have a plurality of alternative possible destinations. In this case the operator may be required to select the next destination port prior to the AVMS completing the undocking operation. During automated operation required user input may be flagged to the user with visible requests on a Multi-Function Display (MFD), and ultimately audible alarms. As a safety measure, should a required input not be completed by the operator by the time it is required (such as berth selection from the multiple available at the time the vessel 121 is ready to enter the Approach Corridor 190) the AVMS will bring the vessel 121 to a stop and hold station until further operator input is received. The Multi-Function Display (MFD) may also be configured to provide an operator interface. Such interface may comprise a touch screen to both display information related to the vessel status and allow the operator to start, stop, and adjust the AVMS behavior. The touch screen shows the vessel states relative to the track as well as alarms and other status information, for example.

In an embodiment, the marine vessel apparatus 120 is configured to maintain the harbor track 170 data for a port of call and a berthing position within the port, wherein the harbor track data comprises: approach corridor data 190 defining bounds on maximum track position deviation allowed during harbor maneuvering; and the approach zone 180 information. The approach zone 180 information further comprises maximum lateral deviation for entering the approach zone 180, and the AVMS method further comprising: comparing the vessel location, speed and heading to the approach zone information and changing from the transit control mode to the autonomous docking control mode in response to the vessel deviation is less than the maximum lateral deviation for entering the approach zone 180.

Furthermore, entry leg data may be determined in response to changing to the autonomous docking control mode, wherein the entry leg data is configured to guide the marine vessel 121 onto a harbor track 170 defined by the harbor track data. In the transit control mode, the marine vessel 121 is configured to be at least partially in manual control mode.

Alignment of the marine vessel 121 may be determined in view of a harbor track 170 using the harbor track data and sail direction determined based on the determined alignment.

In the present description, by vessel are meant any kinds of waterborne vessels, typically marine vessels. Most typically the vessel is a ferry, a cargo ship or large cruise vessel, but the present disclosure is also applicable for yachts, for example.

The apparatus 120 is configured to be connectable to a public network 150, such as Internet, directly via local connection or via a wireless communication network 140 over a wireless connection 122. The wireless connection 122 may comprise a mobile cellular network, a satellite network or a wireless local area network (WLAN), for example. The wireless communication network 140 may be connected to a public data communication network 150, for example the Internet, over a data connection 141. The apparatus 120 may be configured to be connectable to the public data communication network 150, for example the Internet, directly over a data connection that may comprise a fixed or wireless mobile broadband access. The wireless communication network 140 may be connected to a server apparatus 130 of the system 100, over a data connection.

In an embodiment, the marine vessel apparatus 120 may set up local connections within the marine vessel 121 with at least one capturing device and a computer device. The capturing device, such as a sensor, may be integrated to the apparatus 120 or the marine vessel 121, attached to the hull of the marine vessel 121 and connected to the vessel control system or arranged as separate sensor device and connectable to the network 150 over separate connection.

The apparatus 120 and its client application may allow the apparatus 120 to log into a vessel data service run on a server 130, for example.

In an embodiment, real-time interaction may be provided between the apparatus 120 and the server 130 to collaborate for marine vessel data over a network 150. Real-time interaction may also be provided between the apparatus 120 and the remote user device 160 to collaborate for marine vessel data over a network 150, 161.

A sensor data item is generated by a sensor device of the marine vessel 121. Sensor data items may also be transmitted to the server 130. Sensor data items may be processed at the apparatus 120 before transmitting or they may be sent without further processing.

Sensor data may also be stored within the apparatus 120 before transmission over the network 150. Then again, transmitted sensor data may be stored/and or processed at the server apparatus 130 or at the remote user device 160.

The apparatus 120 may be connected to a plurality of different capturing devices and instruments and the apparatus 120 may be configured to select which sensor devices is actively collaborated with.

A user/operator of the apparatus 120 or the remote user device 160 may need to be logged in with user credentials to a chosen service of the network server 130.

In an embodiment, the system 100 comprises a sensor device configured to be comprised by or connectable to the apparatus 120 over a local connection. The local connection may comprise a wired connection or a wireless connection. The wired interface may comprise such as universal serial bus (USB) or National Marine Electronics Association (NMEA) 0183/2000 standard for example. The wireless connection may comprise acoustic connection, Bluetooth™, Radio Frequency Identification (RF-ID) or wireless local area network (WLAN), for example. Near field communication (NFC) may also be used for sensor device identification between the sensor device and the apparatus 120, for example.

In an embodiment, the system 100 may comprise a server apparatus 130, which comprises a storage device 131 for storing service data, service metrics and subscriber information, over data connection 151. The service data may comprise AVMS related data, waypoint properties related data, vessel related data, environmental data, configuration data; account creation data; sensor data; sensor ID's; reference data items, user input data; real-time collaboration data; predefined settings; and attribute data, for example.

In an embodiment, a proprietary application in the apparatus 120 may be a client application of a service whose server application is running on the server apparatus 130 of the system 100.

The proprietary application of the apparatus 120 may receive sensor input data and provide the output data. The input data may comprise data captured by the capturing device, such as a sensor device or a camera.

In an embodiment, configuration information or application download information for any apparatus may be automatically downloaded and configured by the server 130. Thus, the user of the devices may not need to do any initialization or configuration for the service. The system server 130 may also take care of account creation process for the service, such sensor devices, apparatuses and users. Timing of the download may also be configured to be automatic and optimized in view of the vessel travel plan. For example, download may be automatically taking place when the marine vessel is docked at harbor.

In an embodiment, the association of the devices can be one-time or stored persistently on any of the devices or the server 130.

In an embodiment, authentication of a sensor device or apparatus 120 on a system server 130 may utilize hardware or SIM credentials, such as International Mobile Equipment Identity (IMEI) or International Mobile Subscriber Identity (IMSI). The sensor device or apparatus 120 may transmit authentication information comprising IMEI and/or IMSI, for example, to the system server 130. The system server 130 authenticates the device by comparing the received authentication information to authentication information of registered users/devices/vessels/apparatuses stored at the system server database 131, for example. Such authentication information may be used for pairing the devices and/or apparatuses to generate association between them for a vessel data connection.

In an embodiment, a service web application may be used for configuration of a system. The service web application may be run on any user device, admin device, or a remote control device 160, such as a personal computer connected to a public data network, such as Internet 150, for example. The control apparatus 160 may also be connected locally to the apparatus 120 over a local connection 123 and may utilize the network connections of the apparatus 120 for configuration purposes. The service web application of the control apparatus may provide searching/adding instruments, determining attributes, device setup and configuration, for example. The service web application of the control apparatus 160 may be a general configuration tool for tasks being too complex to be performed on the user interface of the apparatus 120, for example.

In an embodiment, a remote control apparatus 160 may be authenticated and configuration data sent from the control apparatus 160 to the system server 130, 131, wherein configuration settings may be modified based on the received data. In an embodiment, the modified settings may then be sent to the apparatus 120 over the network 150 and the local connection or the wireless operator. The modified settings may also be sent to external devices correspondingly, through the apparatus 120 or directly over the network 150, for example.

In an embodiment, the sensor device may be wireless or wired.

The system 100 may also comprise a plurality of satellites 110 in orbit about the Earth. The orbit of each satellite 110 is not necessarily synchronous with the orbits of other satellites and, in fact, is likely asynchronous. A global positioning system receiver apparatus such as the ones described in connection with preferred embodiments of the present disclosed embodiments is shown receiving spread spectrum Global Navigation Satellite System global positioning system (GNSS) satellite signals 112 from the various satellites 110.

The remote control apparatus 160 may be configured to be operated by a remote operator of the vessel 121. The remote control apparatus 160 may be arranged on a ground station, on the vessel 121 or on another vessel, for example.

In an embodiment, starting automated operations may comprise engaging the AVMS followed by activating the "Sail" on the Multi-Function Display (MFD), which will transition the AVMS into the Sail mode. It is required that the AVMS is configured correctly prior to activating "Sail", else the AVMS will not transition into the Sail mode.

Configuration of the AVMS requires that sufficient sensors are online and selected, that sufficient thrusters are online and selected, and that a track 170 and destination 171 have been selected. Depending on the location of the vessel 121 (docked, or in transit under conning control) the operator may have to select from multiple tracks 170 in a track library, or may have to move close to a waypoint 180-187 on the selected track 170 prior to activating the "Sail" mode.

In an embodiment, the Automated Vessel Maneuvering System (AVMS) is configured to support double-ended vessels. The Automated Vessel Maneuvering System (AVMS) is configured to automatically pick the sail direction based on how the vessel 121 is aligned with the track 170 when AVMS is initiated.

In an embodiment, for the operator, automated maneuvering between ports will be a seamless operation starting after the loading ramp is raised and the vessel 121 is ready to undock, and ending when the vessel 121 is in position at a berth in the next port of call and is ready to lower the loading ramp. The automated maneuvering operation may be divided into 3 phases: Transit, Docking, and Undocking, as defined in the following paragraphs.

In an embodiment, the marine vessel apparatus 120 is configured to determine a dynamic setpoint based on the waypoint properties, wherein the dynamic setpoint comprising a setpoint position, a setpoint speed and a setpoint heading that change based on the harbor track data. Furthermore, difference information may be determined between the dynamic setpoint and the determined vessel location using a closed loop controller, a force vector determined based on the difference information; and thruster commands of the autonomous docking control mode controlled based on the force vector.

In an embodiment, the vessel heading may be aligned to the setpoint heading and the vessel speed to the setpoint speed, wherein the setpoint heading and the setpoint speed are configurable parameters.

Furthermore, the setpoint heading and the setpoint speed between waypoints and respective setpoint values may be interpolated based on the marine vessel's location on the track segment, and the vessel heading aligned to the interpolated setpoint heading and the vessel speed to the interpolated setpoint speed. Interpolating may be enabled based on a waypoint property of the waypoint to which the marine vessel is heading.

Docking

The AVMS will contain a pre-planned Harbor track 170 for each port of call, and each berthing position 171 within the port, which can be followed from the harbor entry zone 180 to the berth 171 for the purposes of auto-docking. This track 170 will include an approach corridor 190 which sets bounds on the maximum track position deviation allowed during harbor maneuvering and includes an entry zone 180 that is used when transitioning into the Docking phase. Harbor track 170 data is stored within the marine vessel apparatus 120 for operation of the AVMS and comprises all necessary data for AVMS, such as data relating to the Harbor track 170, the berthing position 171, the waypoints 181-187, the harbor entry zone 180, and the approach corridor 190, for example.

There are some scenarios that must be considered. One scenario covers the case that the vessel 121 is transitioning from an autonomous transit to the Docking phase, and a second scenario covers the case that the vessel 121 is in manual mode (operator performed a manual transit using the conning) and is transitioning to the (autonomous) Docking phase. For both cases the vessel 121 must be positioned within the approach zone 180, and must meet required pre-requisite conditions, to be permitted to transition into the Docking phase.

The pre-requisite conditions for transition to the Docking phase may comprise, for example:
a. Vessel speed must be less than the maximum specified by the approach corridor waypoints 181-187
b. Heading deviation must be less than the maximum specified by the approach corridor 190 waypoints 181-187
c. Lateral deviation must be less than the approach corridor 190 width
d. Heading and lateral deviations will be checked together. A larger heading deviation can be accepted if the vessel 121 is steering towards the Harbor track 170 as opposed to steering away from the track 170.

Once the vessel 121 is positioned within the Approach zone 180, and meets the pre-requisite conditions (see above), an "entry leg" is automatically calculated which is used by the AVMS to autonomously guide the vessel 121 onto the Harbor track 170. At this point the Docking phase has started and the AVMS will proceed to maneuver the vessel 121 to the dock 171 using the pre-programmed speed and steps specified in the Harbor track 170 data.

During the initial approach, the marine vessel apparatus 120 may use GNSS 110 for positioning. Once the vessel 121 reaches the proximity of the specified berth 171, the system may automatically start tracking the vessel's 121 position and heading relative to the berth 171. During the final approach, the marine vessel apparatus 120 may use relative positioning (docking sensor) to allow greater precision during docking. The transition between absolute and relative positioning may be automatically handled in a bump less fashion by the AVMS.

The end of the Docking phase is reached when the vessel 121 has reached the final waypoint 187, is berthed at position 171 and ready to lower the loading ramp, for example. The behavior at the endpoint 171 of the Harbor track 170 may be configurable in the final waypoint 187 properties from the following options, for example: Hold Station (this is the same as station keeping), Transition to the Standby state (switch back to manual control), and Transition to the Docked state.

In all cases, except Hold Station, it may be necessary to transition out of the Docking phase (Sail state) prior to lowering the loading ramp as the vessel 121 position should be secured prior to deploying the ramp.

Separately there may be an option for the AVMS to save particular parameters which will be required during a subsequent Undocking phase (this primarily pertains to the "integrals" which form a dynamic component of the closed loop controller).

In an embodiment, to continue with autonomous operation while berthed, the AVMS can be configured to automatically use the vessel thrusters to hold the vessel 121 against the dock 171 using information contained in the final waypoint 187 properties. In this case when the vessel 121 has completed the Docking phase it will automatically transition to the Docked state and the thrusters will ramp up to push the vessel against the dock.

Undocking

Undocking is basically the opposite procedure to Docking. For the vessel 121 to enter the Undocking phase a new destination (and possibly track (associated with track data), if several are available) must be selected, the loading ramp must be up, and the operator must confirm that the vessel 121 is clear to undock. Once a destination and track (with track data) have been selected and the loading ramp is raised a confirmation request message may appear on the MFD. The operator may be required to confirm the clear to undock request for the AVMS to transition to the Undocking phase and begin the departure from the berth 171. Once confirmed, the AVMS will proceed to maneuver the vessel 121 away from the dock using the pre-programmed speed, and steps contained in the track data.

As for the Docking phase the AVMS may utilize a departure track, a departure corridor, and an exit zone to guide the vessel 121 out of the harbor area. In the majority of cases these will be identical to the track 170, corridor 190, and zone 180 used for harbor entry. The departure track will terminate in the exit zone.

Transit

Autonomous maneuvering of the vessel 121 from the final Harbor track waypoint in the exit zone, and the first Harbor track waypoint 181 in the entry zone 180 for the next port is referred to as the Transit phase. In this phase the AVMS will follow a transit track using information contained within the waypoints included in the track data to control vessel speed and heading.

Transition between the Transit phase and the Docking/Undocking phases is configured to be bump less. During these transitions the AVMS will be transitioning between High Speed Track Follow mode (HSTF) and Low Speed Track Follow mode (LSTF) gradually with speed, however this transition may be transparent to the operator.

During the docking and undocking phases, the system will operate in Automated Harbor Maneuvering (AHM) mode to automatically follow and execute precise maneuvers along the Harbor track 170. The Harbor track 170 data includes all the necessary information to maneuver the vessel between the docked position 171 and the entry/exit zone 180.

Harbor tracks 170 may comprise straight line segments (legs) joined at waypoints 181-187 with independent pre-defined turning radii for the purpose of precision maneuvering inside the harbor and close to the berth 171. Due to the precise maneuvering requirements inside the harbor and close to the berth, the harbor track 170 will include a comprehensive set of waypoint properties, which will not only help to guide the vessel 121 but also control the behavior of the control system along the track 170. Table below lists some waypoint properties that may be used for the harbor track 170 purposes.

| Waypoint properties | Description |
| --- | --- |
| Lat/Lon | Absolute waypoint position |
| Radius | Waypoint Turning radius |
| Corridor width | Allowed lateral distance centered over the waypoint in which the vessel can sail |
| Track setpoint speed | Target setpoint speed |
| Track setpoint acceleration | Target setpoint acceleration |
| Heading setpoint (along track, fixed) | Target setpoint heading |
| Heading setpoint ROT | Target setpoint Rate of Turn |
| Advance turn | Distance in meters prior to the waypoint upon which the heading change will be executed |
| Track Direction (ahead, astern) | |
| COR | Center of rotation-see yaw pivot point |
| Controller mode | To set the control strategy based on position along the track |
| Controller gains | Controller gains in surge, sway, yaw, cross track |
| TAL mode | To set the thruster allocation logic based on position along the track |
| Cross track alarm threshold | Alarm threshold for cross track position error |
| Alongship alarm threshold | Alarm threshold for along track position error |
| Heading alarm threshold | Alarm threshold for heading error |
| Auto sensor select | To automatically enable sensors based on position along the track |
| Max speed threshold (alongship/athwartship) | Max speed allowed to engage the mode |
| Max Hdg deviation threshold | Maximum allowed heading deviation to engage the mode |
| Thrust to dock | If enabled, and at the last waypoint on the track, the system will command thrust against the dock to keep the vessel in position |
| Freeze integral | If enabled, and at the last waypoint on the track, the controller integral will be frozen to prevent integral windup when in the docked position |
| Confirm to proceed | If enabled, a confirmation dialog will be displayed for pre-defined time prior to the waypoint is reached. If not confirmed, the system will stop the vessel at the waypoint. Waypoint with this property set, will have a conspicuous appearance on the display |
| Interpolate speed | If enabled, the speed setpoint will be interpolated between values of the From and To waypoints. If disabled, the speed setpoint will be set to the value of the From waypoint's. |
| Interpolate heading | If enabled, the heading setpoint will be interpolated between the values of the From and To waypoints. If disabled, the speed setpoint will be set to the value of the From waypoint's. |

When following a Harbor track 170, a plurality of actions and parameters may be needed. Following features are exemplary only and not necessarily all features are needed.

Adjusting the Speed

The default setpoint speed for AHM mode is pre-programmed into the Harbor track 170 data using a waypoint 181-187. The operator can override (reduce) the setpoint speed by using an MFD onscreen control scaled between 0 and 100%, for example.

In an embodiment, the operator can adjust the speed in increments of 0.5 knots, for example. The speed may be increased or decreased as long as it remains within the defined track limits.

Stopping

While in AHM mode, the operator can stop the vessel 121 on the track at any time by activating the MFD "Current Position" function. This will bring the vessel 121 to a stop on the track 170 by following a specified deceleration profile. During the deceleration, the "Current Position" function may be indicated on user interface to indicate that deceleration is in progress. If the operator activates the "Current Position" function a second time while it is already in process, the setpoint will come to an immediate stop. Both actions described above may require an MFD onscreen confirmation to prevent inadvertent action. While the vessel 121 is stopping, or stopped, a "Continue" function will be enabled. By activating the "Continue" function it will continue to execute the maneuvering steps defined in the Harbor track 170 data.

Track Offsets

While in AHM mode, the operator can adjust the vessel's 121 lateral position relative to the track 170, for example, by using MFD on-screen "port" and "starboard" offset functions. Each time a function is activated, the lateral offset will be incremented in the direction of the activated function (e.g. touch based button or icon on touch display). The offsets may be numerically and graphically displayed on the MFD overview display. In addition, the offset track line may be displayed relative to the default track. The offset will be limited by the corridor 190 width of the Harbor track 170 at the position of the setpoint. If the operator tries to place the offset outside the corridor 190, a warning may be displayed on the MFD. If the corridor 190 width is reduced as the vessel 121 is moving along the track 170, the track offsets will be automatically reduced to keep the vessel 121 safely inside the corridor 190. An offset reset function will be provided to allow the operator to remove offsets in a single step.

Track Control

During high speed tracking, the vessel 121 may follow the heading of the track 170 with the necessary heading adjustments to maintain zero cross track error. The heading adjustments will be made using the high-speed steering allocation (e.g. rudders or main azimuth thrusters).

During low speed tracking, the vessel 121 can optionally align its heading to a pre-programmed setpoint heading. This allows the vessel 121 to perform crabbing maneuvers during the approach. Heading and speed setpoints are configurable waypoint 181-187 properties. Between waypoints 181-187, the speed and heading setpoints may be interpolated based on the vessel's 121 location on the track 170. The interpolation option is configurable by a waypoint property of the waypoint 181-187 to which the vessel 121 is heading.

The yaw pivot point is the point on the vessel's 121 centerline which appears to be the center of rotation to an on-board observer. The lateral sway velocity at the point is by definition zero. This is important because that means that if the pivot point is used as the control point, sway control force is not needed to be used while turning. The location of a vessel's 121 yaw pivot point may depend on the vessel's turn rate and lateral velocity.

In an embodiment, prior to engaging automatic maneuvering, it is necessary to verify that all necessary thrusters are fully operational. Since thrusters may not have been in use for extended periods of time, a thruster ready indication may not be sufficient to guarantee the operation of the thruster. For this purpose, an automated thruster check function is used that automatically issues a command and verifies that the thruster is following as expected. Successful thruster checks immediately prior to engaging AHM, can be included as a condition for system readiness.

In an embodiment, a control mode of the marine vessel 121 is determined from track properties (track data) and vessel speed, for example. Difference information between the dynamic setpoint and the determined vessel location may then be determined using a closed loop controller and a force vector determined based on the difference information. Thruster commands are determined from the control mode and the force vector.

Furthermore, external force information may be determined by the apparatus 120, the force vector may be then combined with the external force information, and the thruster commands determined based on the combination. At least one thruster may be controlled based on the thruster commands. The external force information may comprise e.g. wind information that is detected using a capturing device (e.g. wind sensor), for example.

Figure 2:
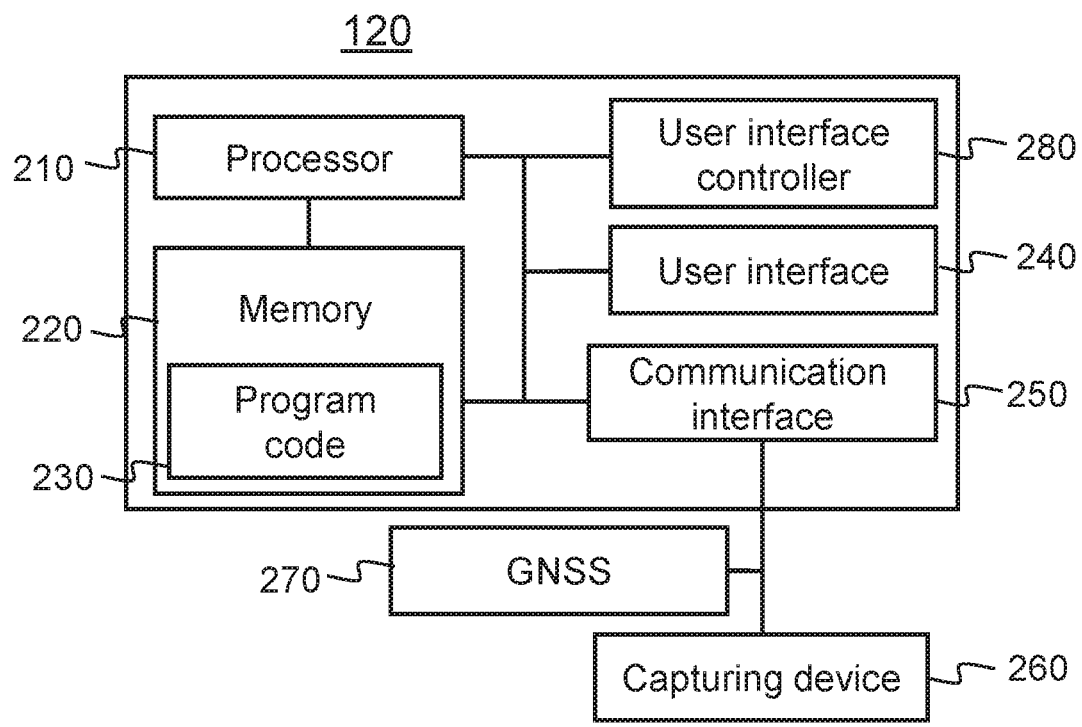
FIG. 2 presents an example block diagram of a user apparatus in which various embodiments of the present disclosure may be applied.

FIG. 2 presents an example block diagram of a marine vessel apparatus 120 in which various embodiments of the present disclosure may be applied. The marine vessel apparatus 120 is configured to operate for autonomous docking.

The general structure of the marine vessel apparatus 120 comprises a user interface 240, a communication interface 250, a satellite positioning device (GNSS) 270, a capturing device 260 for capturing current vessel activity data and current environmental data, a processor 210, and a memory 220 coupled to the processor 210. The marine vessel apparatus 120 further comprises software 230 stored in the memory 220 and operable to be loaded into and executed in the processor 210. The software 230 may comprise one or more software modules and can be in the form of a computer program product. The marine vessel apparatus 120 may further comprise a user interface controller 280.

The processor 210 may be, e.g., a central processing unit (CPU), a microprocessor, a digital signal processor (DSP), a graphics processing unit, or the like. FIG. 2 shows one processor 210, but the apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 120 may comprise a plurality of memories. The memory 220 may be constructed as a part of the apparatus 120 or it may be inserted into a slot, port, or the like of the user apparatus 120 by a user. The memory 220 may serve the sole purpose of storing data, or it may be constructed as a part of an apparatus serving other purposes, such as processing data. A proprietary autonomous marine vessel docking application, track data, autonomous vessel mode related data, sensor data, vessel related data or environmental data may be stored to the memory 220.

In an embodiment, the apparatus 120 is configured to perform a computer-implemented method for autonomous marine vessel docking, the method comprising determining a transit control mode associated with route plan data defining transit operation between ports; determining an autonomous docking control mode associated with harbor track data comprising a set of waypoint properties and defining approach zone information and track segments joined at waypoints. The approach zone information comprises location area information for the approach zone; maximum vessel speed for entering the approach zone; and maximum heading deviation for entering the approach zone. The method further comprises determining vessel location, speed and heading; comparing the vessel location, speed and heading to the approach zone information and changing from the transit control mode to the autonomous docking control mode in response to: the vessel location comprised by the location area information; the vessel speed being lower than the maximum vessel speed for entering the approach zone; and the vessel heading matching criteria defined by the maximum heading deviation for entering the approach zone.

The user interface controller 280 or the user interface 240 may comprise circuitry for receiving input from a user of the marine vessel apparatus 120, e.g., via a keyboard, graphical user interface shown on the display of the user interfaces 240 of the marine vessel apparatus 120, speech recognition circuitry, or an accessory device, such as a headset, and for providing output to the user via, e.g., a graphical user interface or a loudspeaker.

The Global Navigation Satellite System (GNSS, such as GPS) device 270 is configured to provide location information. Such information may comprise, for example, position coordinates, speed, direction of movement; and flute height information.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as universal serial bus (USB) or National Marine Electronics Association (NMEA) 0183/2000 standard for example. The communication interface module 250 may be integrated into the marine vessel apparatus 120, or into an adapter, card or the like that may be inserted into a suitable slot or port of the marine vessel apparatus 120. The communication interface module 250 may support one radio interface technology or a plurality of technologies. The marine vessel apparatus 120 may comprise a plurality of communication interface modules 250.

A skilled person appreciates that in addition to the elements shown in FIG. 2, the marine vessel apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the marine vessel apparatus 120 may comprise a disposable or rechargeable battery (not shown) for powering when external power if external power supply is not available.

In an embodiment, the marine vessel apparatus 120 comprises speech recognition means. Using these means, a pre-defined phrase may be recognized from the speech and translated into control information for the apparatus 120, for example.

The satellite positioning device 270 and the capturing device 260 may be configured to be comprised by the marine vessel apparatus 120 or connected as separate devices to the apparatus 120. In case the satellite positioning device 270 and the capturing device 260 are comprised in the apparatus 120 they may be connected to the apparatus 120 using an internal bus of the apparatus 120. In case the satellite positioning device 270 and the capturing device 260 are external devices connected to the apparatus 120 they may be connected to the apparatus 120 using communication interface 250 of the apparatus 120 or using a connection to the internal bus.

In an embodiment, the capturing device 260 may comprise a global navigation satellite system (GNSS) position sensor and a docking sensor. The marine vessel apparatus 120 is configured to select the global navigation satellite system (GNSS) position sensor as positioning information source in a first set of the track segments, determine vessel distance to the berth, and select the docking sensor as positioning information source in a second set of the track segments in response to the vessel distance being less than a pre-defined threshold.

Figure 3:
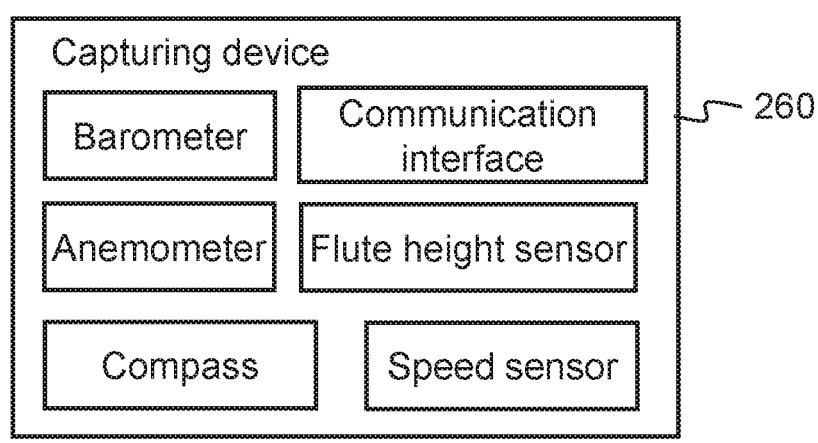
FIG. 3 presents an example block diagram of a capturing device in which various embodiments of the present disclosure may be applied.

FIG. 3 presents an example block diagram of a capturing device 260, such as a sensor or sensor device, in which various embodiments of the present disclosure may be applied. The capturing device 260 may comprise various means for activity data detection and environmental data detection, for example. The capturing device 260 may be used for both reference data and current data capturing.

In an embodiment, the capturing device 260 may comprise at least one of the following devices:
an anemometer for providing wind information;
a wind sensor for providing wind information;
a sensor for providing flute height information;
a barometer for measuring air pressure;
a temperature sensor for measuring environmental temperature;
a water depth sensor for measuring depth information;
a chart plotter for providing position information;
a sail sensor for providing sail information;
a speed sensor for providing speed information;
a video camera for providing a video signal;
a gyro compass for providing direction information;
GNSS device, i.e. absolute position sensor based on satellite navigation (GLONASS, GPS, GALILEO); and
a motion reference unit (MRU) sensor, i.e. pitch and roll sensor.

In an embodiment, the marine vessel apparatus 120 may include a suite of sensors 260 that will provide position and environment data to support the controller operation. GNSS sensor comprises as absolute position sensor based on satellite navigation (GLONASS, GPS, GALILEO) that provides the current measured position of the vessel on the earth's surface. The GNSS system that may be used, for example, is Fugro OceanStar™ 3 that offers decimeter accuracy for position measurements with a combination of three GNSS receivers. Data is also available from individual receivers as a backup position measurement method, though with less available accuracy. Gyro Compass comprises an absolute heading sensor that provides the measured offset of the vessel from true north. The motion reference unit (MRU) sensor comprises a pitch and roll sensor that provides measured offset from the vertical for pitch and roll. The GNSS system may include its own captive motion reference unit (MRU). This may be required to increase accuracy of the GNSS since the GNSS antenna can swing through a large arc during pitch and roll. Mathematical calculation can be used to normalize the measurement to the vertical based on the pitch and roll measurement.

The capturing device 260 may also comprise several capturing devices 260, combinations of any above-mentioned devices, and the like. The environmental temperature may comprise air temperature, water temperature or ground surface temperature, for example.

In an embodiment, a wind sensor 260 is configured to determine or measure wind angle and wind speed. The wind sensor 260 may comprise any element of combination of elements operable to sense wind-related information for use by the user apparatus 120. For example, the wind sensor 260 may be operable to sense apparent wind speed, apparent wind angle, true wind speed, true wind angle, wind velocity made good (VMG), combinations thereof, and the like.

In an embodiment, a sail sensor 260 is configured to determine sail information. The sail information provides status of the currently used sails in a boat and timing of their changes. The sail sensor 260 may comprise a first sensor in a mast of the boat and a second sensor in the sail to identify which sail is used in the mast. Based on the information received from these sensors the user apparatus 120 may define which sails are used in which masts and the times of changing the sails. The sail information may be thus used as a part of the reference activity data and current activity data. Sail may also comprise rotor sail or other similar mechanical sail system.

In an embodiment, a video camera 260 is configured to provide video signal. Based on the video signal the marine vessel apparatus 120 may determine at least part of the environmental data or object information around the marine vessel 121. For example, flute height may be determined based on the video signal from the video camera 260. The determination may be done by video image processing, pattern recognition, measuring a rocking movement or relative movement of a horizon, for example.

The capturing device 260 may comprise communication interface module implementing at least part of data transmission. The communication interface module may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as universal serial bus (USB) or National Marine Electronics Association (NMEA) 0183/2000 standard for example. The communication interface module may be integrated into the capturing device 260, or into an adapter, card or the like that may be inserted into a suitable slot or port of the capturing device 260. The communication interface module may support one radio interface technology or a plurality of technologies. The capturing device 260 may comprise a plurality of communication interface modules.

Figure 4:
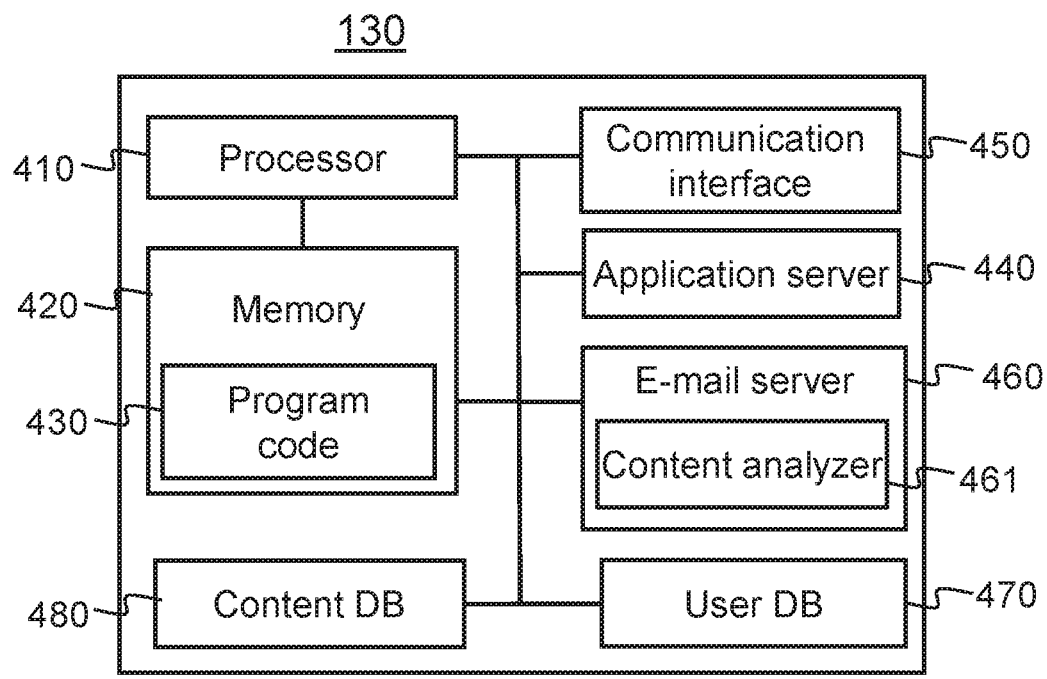
FIG. 4 presents an example block diagram of a server apparatus in which various embodiments of the present disclosure may be applied.

FIG. 4 presents an example block diagram of a server apparatus 130 in which various embodiments of the present disclosure may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as universal serial bus (USB) or National Marine Electronics Association (NMEA) 0183/2000 standard for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. Captured autonomous docking related data, track data, vessel activity data associated or environmental data of the marine vessel apparatus 120 may be received by the server apparatus 130 using the communication interface 450. Data may be stored for backup or processed and provided to a marine vessel apparatus. The data may be utilized for AVMS of another marine vessel or a fleet, for example.

The e-mail server process 460, which receives e-mail messages sent from marine vessel apparatuses 120 and computer apparatuses 160 via the network 150. The server 460 may comprise a content analyzer module 461, which checks if the content of the received message meets the criteria that are set for new activity data item of the service. The content analyzer module 461 may for example check whether the e-mail message contains a valid vessel activity data item to be used as reference data item in further autonomous vessel processing, for example. The valid reference data item received by the e-mail server is then sent to an application server 440, which provides application services e.g. relating to the user accounts stored in a user database 470 and content of the content management service. Content provided by the service system 100 is stored in a content database 480.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
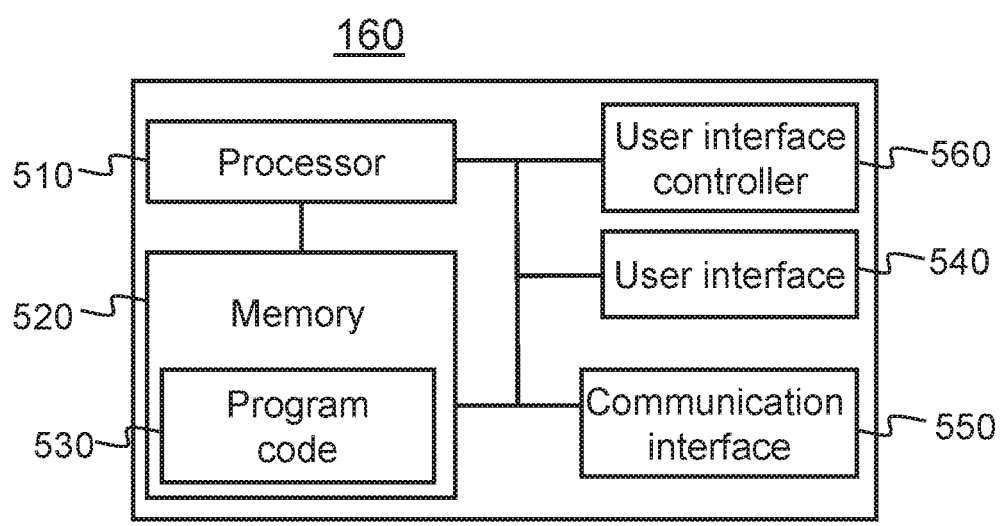
FIG. 5 presents an example block diagram of a computer apparatus in which various embodiments of the present disclosure may be applied.

FIG. 5 presents an example block diagram of a computer apparatus 160 in which various embodiments of the present disclosure may be applied. The computer apparatus 160 may be a user equipment (UE), user device or apparatus, such as a mobile terminal, a smart phone, a laptop computer, a desktop computer or other communication device.

The general structure of the computer apparatus 160 comprises a user interface 540, a communication interface 550, a processor 510, and a memory 520 coupled to the processor 510. The computer apparatus 160 further comprises software 530 stored in the memory 520 and operable to be loaded into and executed in the processor 510. The software 530 may comprise one or more software modules and can be in the form of a computer program product. The computer apparatus 160 may further comprise a user interface controller 560.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The computer apparatus 160 may comprise a plurality of memories. The memory 520 may be constructed as a part of the computer apparatus 160 or it may be inserted into a slot, port, or the like of the computer apparatus 160 by a user. The memory 520 may serve the sole purpose of storing data, or it may be constructed as a part of an apparatus serving other purposes, such as processing data.

The user interface controller 560 may comprise circuitry for receiving input from a user of the computer apparatus 160, e.g., via a keyboard, graphical user interface shown on the display of the user interfaces 540 of the computer apparatus 160, speech recognition circuitry, or an accessory device, such as a headset, and for providing output to the user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as universal serial bus (USB) or National Marine Electronics Association (NMEA) 0183/2000 standard for example. The communication interface module 550 may be integrated into the computer apparatus 160, or into an adapter, card or the like that may be inserted into a suitable slot or port of the computer apparatus 160. The communication interface module 550 may support one radio interface technology or a plurality of technologies. The computer apparatus 160 may comprise a plurality of communication interface modules 550.

A skilled person appreciates that in addition to the elements shown in FIG. 5, the computer apparatus 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the computer apparatus 160 may comprise a disposable or rechargeable battery (not shown) for powering when external power if external power supply is not available.

Figure 6:
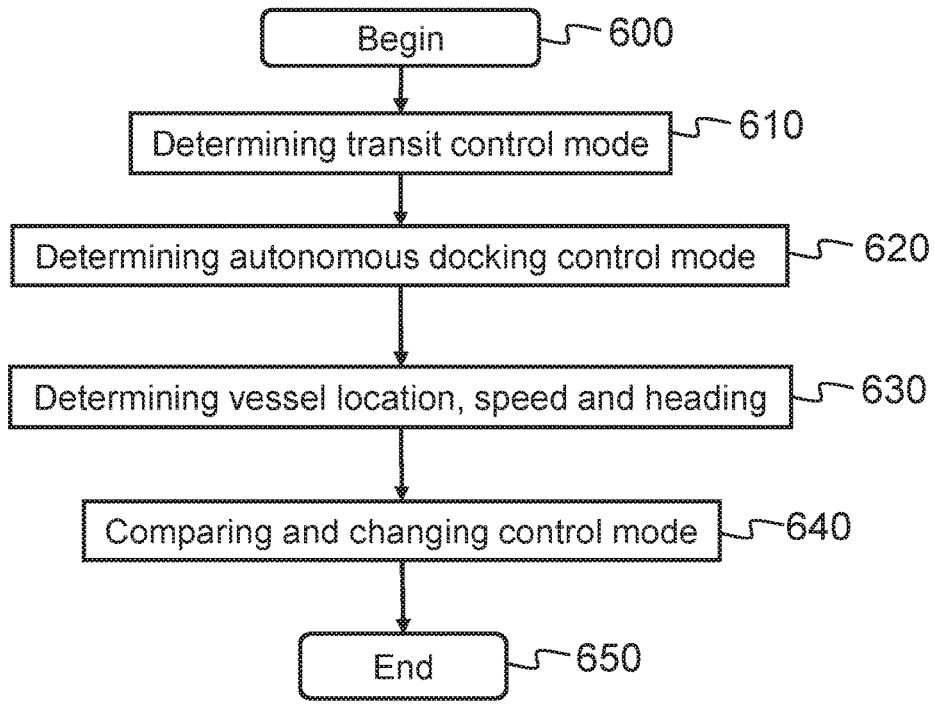
FIG. 6 shows a flow diagram showing operations in accordance with an example embodiment of the present disclosure.

FIG. 6 shows a flow diagram showing operations in accordance with an example embodiment of the present disclosure. In step 600, computer-implemented method for autonomous marine vessel docking is started. In step 610, a transit control mode associated with route plan data defining transit operation between ports is determined. In step 620, an autonomous docking control mode associated with harbor track data comprising a set of waypoint properties and defining approach zone information and track segments joined at waypoints is determined, wherein the approach zone information comprises:

location area information for the approach zone;

maximum vessel speed for entering the approach zone; and maximum heading deviation for entering the approach zone;

In step 630, vessel location, speed and heading are determined. In step 640, the vessel location, speed and heading are compared to the approach zone information and the transit control mode is changed to the autonomous docking control mode in response to:

the vessel location comprised by the location area information;

the vessel speed being lower than the maximum vessel speed for entering the approach zone; and the vessel heading matching criteria defined by the maximum heading deviation for entering the approach zone.

The method is ended in step 650.

Figure 7:
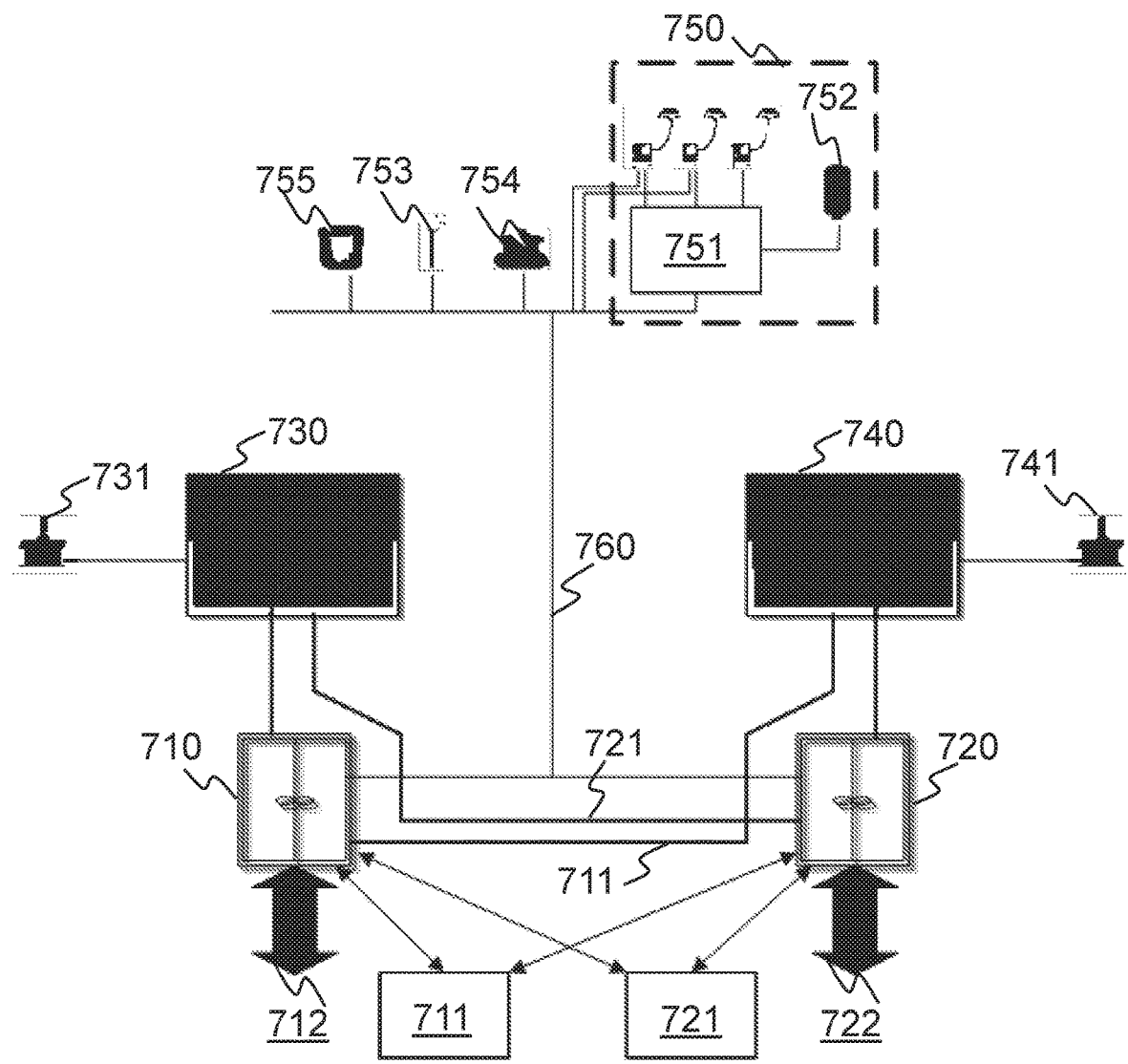
FIG. 7 shows a schematic picture of a control system according to an example embodiment of the present disclosure.

FIG. 7 shows a schematic picture of a control system (AVMS) 700 according to an example embodiment of the present disclosure. The marine vessel apparatus 120 of FIG. 2 comprises most of the elements of the system 700.

The Automated Vessel Maneuvering System (AVMS) 700 may include dual control processors (CP) 710, 720, and dual operator workstations 730, 740 interconnected using dual redundant networks 711, 721 as shown in FIG. 7.

An MFD (Multi-Function Display) 730, 740 may comprise a computer, a display with touchscreen, and a non-spring loaded 3 axis joystick 731, 741, for example. The MFD 730, 740 may be configured to be used for all operator interaction with the system and may provide a method for the operator to select routing, destination and harbor track information for the vessel. The MFD may also be responsible for presenting alarm information during operations.

A GNSS system 750 is configured to provide absolute position sensor based on satellite navigation (GLONASS, GPS, GALILEO) that may comprise a plurality of GNSS receivers, an own motion reference unit (MRU) 752 and a bridge cabinet 751, for example, that provides the current measured position of the vessel on the earth's surface. The GNSS system 750 may comprise, for example, Fugro OceanStar™ 3 that offers decimeter accuracy for position measurements through the use of a combination of 3 GNSS receivers, as shown in FIG. 7. Data is also available from individual receivers as a backup position measurement method, though with less available accuracy.

Further sensors 753-755, such as existing ship's gyro sensor 755, a wind sensor 753 and a guidance marine motion reference unit (MRU) sensor 754 are also illustrated. The sensors 750-755 may be connected to the control processors 710-720 over a serial bus 760. The control processors 710, 720 may also be operationally connected with a hybrid controller (FWD) 711 and a hybrid controller (AFT) 721, respectively. Connections between the hybrid controllers 711, 721 and the control processors 710, 720 may be carried out using Modbus RTU, for example. The control processors 710, 720 may also be configured to provide I/O access 712, 722 to/from thrusters of the marine vessel.

In an embodiment, the marine vessel may comprise a plurality of thrusters. A maneuvering thruster (bow thruster or stern thruster) is a transversal propulsion device built into, or mounted to, either the bow or stern, of a ship or boat, to make it more maneuverable. Bow thrusters make docking easier, since they allow the vessel to be turned to port or starboard side, without using the main propulsion mechanism which requires some forward motion for turning. The effectiveness of a thruster is curtailed by any forward motion due to the Coandă effect. A stern thruster is of the same principle, fitted at the stern. Large ships might have multiple bow thrusters and stern thrusters. Large vessels usually have one or more tunnel thrusters built into the bow, below the waterline. An impeller in the tunnel can create thrust in either direction which makes the ship turn. Most tunnel thrusters are driven by electric motors, but some are hydraulically powered. These bow thrusters, also known as tunnel thrusters, may allow the ship to dock without the assistance of tugboats, saving the costs of such service.

In an embodiment, the Automated Vessel Maneuvering System (AVMS) of the marine vessel may be configured to automatically control sway control devices, such as thrusters at different speeds. Thus, a smooth transition is enabled from high speed transit between ports, to port approach and autonomous docking, and allows operation at any speed. For example, at low speeds, direct sway control is used. This control is gradually reduced as the vessel accelerates such that there is no direct sway control at high speeds. This functionality is what allows Automated Vessel Maneuvering System (AVMS) to take the vessel from high speeds in open water down to a stop at the dock.

The setup illustrated in FIG. 7 is an example only. The system may be configured in a variety of ways depending on redundancy and bridge layout needs, for example. Thus, the system may comprise 1, 2, or 3 control processors 710, 720 and any number of MFD's (Multi-Function Display) 730, 740, and different numbers of sensors 750-754 as well, for example.

Figure 8:
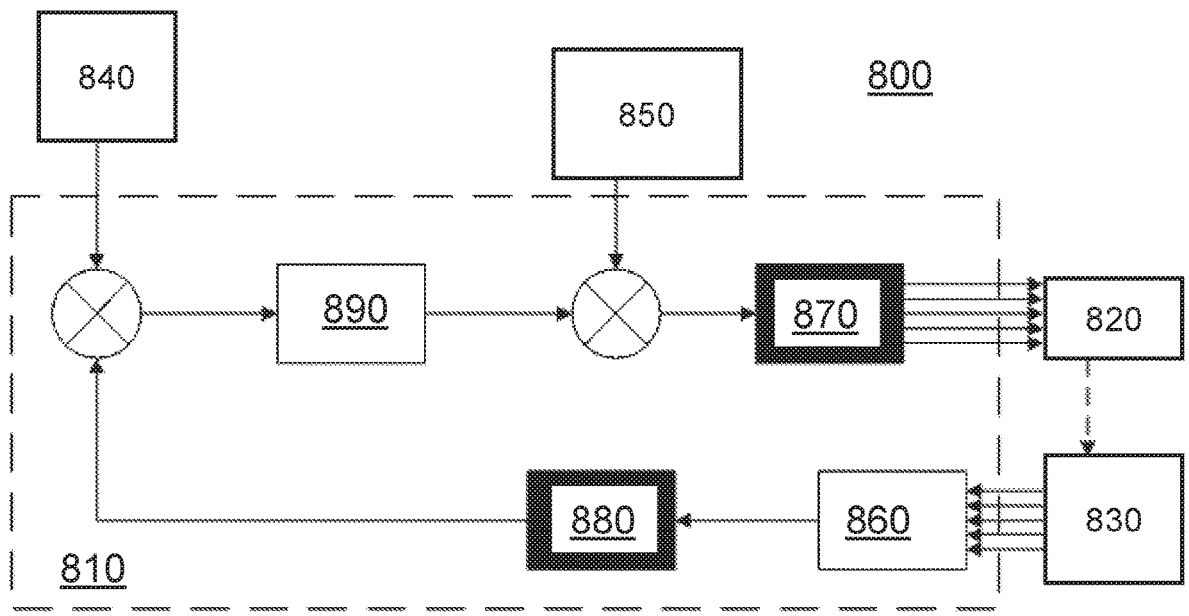
FIG. 8 shows a schematic picture of a closed loop controller block diagram according to an example embodiment of the present disclosure.

FIG. 8 shows a schematic picture of a closed loop controller block diagram 800 according to an example embodiment of the disclosed embodiments.

A control processor 710, 720 as shown in FIG. 7 may comprise a closed loop controller 810 and a rack of IO 820-850 that is used to interface the system, with the thrusters on the vessel, for example.

The control processor comprises the closed loop controller 810 that works in tandem with a sensor processing module 860 and a Thruster Allocation Logic (TAL) module 870. In simple terms the closed loop controller 810 is used to maintain the vessel over position and heading setpoints based on position and heading setpoint information 840 that may be pre-programmed and accessible in relation to waypoints of harbor track information. For station keeping the setpoint would consist of a fixed location and bearing, however for transit and docking operations the setpoint consists of a position and heading that is constantly changing as it is moved along a track between a series of waypoints. As the setpoint is moved, the closed loop controller 810 will calculate the difference between the setpoint 840 and actual vessel position, and will use this to calculate a force vector required to close the distance between the two positions. The actual vessel position is calculated based on position and heading sensor data 830, processed by the sensor processing module 860 to provide position estimate that is filtered by a Kalman filter module 880 to provide the position and heading estimate to be compared with the setpoint 840. A force vector may be determined by a proportional-integral-derivative controller (PID controller or three term controller) 890 that is translated into actual thruster commands (after subtracting environmental data 850, such as external forces like wind) by a Thruster Allocation Logic (TAL) 870, and the 10 rack 820 is then used to communicate these commands to each thruster.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the disclosed embodiments are set out in the independent claims, other aspects of the present disclosure comprise other combinations of features from the described embodiments and/or the dependent claims with the features of the independent claims, and not solely the combinations explicitly set out in the claims.

Without in any way limiting the scope, interpretation, or application of the claims appearing below, a technical effect of one or more of the example embodiments disclosed herein is improved method and apparatus for autonomous marine vessel docking.

Another technical effect of one or more of the example embodiments disclosed herein is that it enables performing the docking maneuver automatically in the safest and most efficient way possible. The procedure means that as the vessel approaches the dock, it is programmed with all the relevant variables, such as wind speed, weight, pitch, roll, water depth and current. This data enables it to perform the docking maneuver automatically in the safest and most efficient way possible. While the ship's captain may have oversight, the steering is principally handled by software. The system has two control processors to provide full redundancy and safety during docking. It also features two operator work stations for easy viewing, regardless of whether the ship is sailing bow forward or aft forward. Full redundancy is also being applied to the system's sensors.

Another technical effect of one or more of the example embodiments disclosed herein is that safety is improved since there is less likelihood of human error; less wear and tear since the thrusters are efficiently utilized; and greater efficiency in docking which allows more time at berth.

Although various aspects of the disclosed embodiments are set out in the independent claims, other aspects of the present disclosure comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer-implemented method for autonomous marine vessel docking for a marine vessel, the method comprising:
   determining a transit control mode associated with route plan data defining transit operation between ports;
   determining an autonomous docking control mode associated with harbor track data comprising a set of waypoint properties and defining approach zone information and track segments joined at waypoints, wherein the approach zone information comprises:
   location area information for an approach zone;
   maximum vessel speed for entering the approach zone; and
   maximum heading deviation for entering the approach zone;
   determining vessel location, speed and heading;
   comparing the vessel location, speed and heading to the approach zone information and changing from the transit control mode to the autonomous docking control mode in response to:
   the vessel location comprised by the location area information;
   the vessel speed being lower than the maximum vessel speed for entering the approach zone; and the vessel heading matching criteria defined by the maximum heading deviation for entering the approach zone;
determining a dynamic setpoint based on the set of waypoint properties, wherein the dynamic setpoint comprises a setpoint position, a setpoint speed and a setpoint heading that changes based on the harbor track data;
interpolating the setpoint heading and the setpoint speed between waypoints and respective setpoint values based on the vessel location on a track segment; and
aligning the vessel heading to the interpolated setpoint heading and the vessel speed to the interpolated setpoint speed.

2. The method of claim 1, further comprising:
determining difference information between the dynamic setpoint and the determined vessel location using a closed loop controller;
determining a force vector based on the difference information; and
controlling thruster commands of the autonomous docking control mode based on the force vector.

3. The method of claim 1, further comprising:
aligning the vessel heading to the setpoint heading and the vessel speed to the setpoint speed, wherein the setpoint heading and the setpoint speed are configurable parameters.

4. The method of claim 1, wherein interpolating is enabled based on a waypoint property of the waypoint to which the marine vessel is heading.

5. The method of claim 1, further comprising:
defining a lower speed threshold and a higher speed threshold; and
determining sway control information based on the dynamic setpoint and the determined vessel location.

6. The method of claim 5, further comprising:
controlling, in a low speed mode, sway controlling thruster commands of at least one thruster of the marine vessel based on the sway control information by activating full scale three axis position and heading control by allocating full scale thrust to the at least one thruster of the marine vessel, when the vessel speed is less than a lower speed threshold.

7. The method of claim 5, further comprising:
disabling, in a high-speed mode, sway controlling thruster commands of at least one thruster of the marine vessel when the vessel speed is greater than the higher speed threshold.

8. The method of claim 5, further comprising:
controlling, in an intermediate speed mode, sway controlling thruster commands of at least one thruster of the marine vessel based on the sway control information by activating partial scale three axis position and heading control by allocating partial scale thrust to the at least one thruster of the marine vessel, when the vessel speed is between the lower and higher speed threshold.

9. The method of claim 8, wherein the partial scale three axis position is smaller than the full scale.

10. The method of claim 8, wherein in the intermediate speed mode, the partial scale three axis position is gradually changed between zero and the full scale with respect to the vessel speed.

11. The method of claim 10, wherein in the intermediate speed mode, the partial scale three axis position is gradually increased from zero to the full scale with respect to the vessel speed decreasing from a higher speed threshold to a lower speed threshold.

12. The method of claim 1, further comprising:
maintaining the harbor track data for a port of call and a berthing position within the port, wherein the harbor track data comprises:
approach corridor data defining bounds on maximum track position deviation allowed during harbor maneuvering; and
the approach zone information.

13. The method of claim 12, wherein the approach zone information further comprises maximum lateral deviation for entering the approach zone, and the method further comprising:
comparing the vessel location, speed and heading to the approach zone information and changing from the transit control mode to the autonomous docking control mode in response to:
a vessel deviation being less than a maximum lateral deviation for entering the approach zone.

14. The method of claim 1, further comprising:
determining entry leg data in response to changing to the autonomous docking control mode, wherein the entry leg data is configured to guide the marine vessel onto a harbor track defined by the harbor track data.

15. The method of claim 1, wherein in the transit control mode the marine vessel is configured to be at least partially in manual control mode.

16. The method of claim 1, further comprising:
determining alignment of the marine vessel in view of a harbor track using the harbor track data; and
selecting sail direction based on the determined alignment.

17. A marine vessel apparatus for autonomous docking for a marine vessel, comprising:
at least one sensor:
a communication interface for transceiving data;
at least one processor; and
at least one memory including computer program code;
the at least one memory and the computer program code with the at least one processor, configured to cause the marine vessel apparatus to:
determine a transit control mode associated with route plan data defining transit operation between ports;
determine an autonomous docking control mode associated with harbor track data comprising a set of waypoint properties and defining approach zone information and track segments joined at waypoints, wherein the approach zone information comprises:
location area information for an approach zone;
maximum vessel speed for entering the approach zone; and
maximum heading deviation for entering the approach zone;
determine vessel location, speed and heading;
compare the vessel location, speed and heading to the approach zone information and changing from the transit control mode to the autonomous docking control mode in response to:
the vessel location comprised by the location area information;
the vessel speed being lower than the maximum vessel speed for entering the approach zone; and
the vessel heading matching criteria defined by the maximum heading deviation for entering the approach zone;
determine a dynamic setpoint based on the set of waypoint properties, wherein the dynamic setpoint comprises a setpoint position, a setpoint speed and a setpoint heading that changes based on the harbor track data;

interpolate the setpoint heading and the setpoint speed between waypoints and respective setpoint values based on the vessel location on a track segment; and align the vessel heading to the interpolated setpoint heading and the vessel speed to the interpolated setpoint speed.

18. The apparatus of claim 17, wherein the at least one memory and the computer program code, with the at least one processor, are further configured to cause the apparatus to:

select a global navigation satellite system (GNSS) position sensor as positioning information source in a first set of track segments; and determine vessel distance to a berth and select a docking sensor as positioning information source in a second set of the track segments in response to a vessel distance being less than a pre-defined threshold.

19. The apparatus of claim 18, further comprising:

a plurality of thrusters; and wherein the at least one memory and the computer program code with the at least one processor, are further configured to cause the apparatus to:

determine external force information;

combine a force vector with the external force information, wherein the force vector is determined based on difference between a dynamic setpoint and a vessel location;

determine thruster commands based on the combination; and control full three axis position and heading by allocating thrust to the plurality of thrusters based on the thruster commands.

20. A computer program product embodied on a non-transitory computer readable medium comprising computer executable program code, when executed by at least one processor of an apparatus, causes the apparatus to:

determine a transit control mode associated with route plan data defining transit operation between ports;

determine an autonomous docking control mode associated with harbor track data comprising a set of waypoint properties and defining approach zone information and track segments joined at waypoints, wherein the approach zone information comprises:

location area information for an approach zone;

maximum vessel speed for entering the approach zone; and maximum heading deviation for entering the approach zone;

determine vessel location, speed and heading;

compare the vessel location, speed and heading to the approach zone information and changing from the transit control mode to the autonomous docking control mode in response to:

the vessel location comprised by the location area information;

the vessel speed being lower than the maximum vessel speed for entering the approach zone; and the vessel heading matching criteria defined by the maximum heading deviation for entering the approach zone;

determine a dynamic setpoint based on the set of waypoint properties, wherein the dynamic setpoint comprises a setpoint position, a setpoint speed and a setpoint heading that changes based on the harbor track data;

interpolate the setpoint heading and the setpoint speed between waypoints and respective setpoint values based on the vessel location on a track segment; and align the vessel heading to the interpolated setpoint heading and the vessel speed to the interpolated setpoint speed.

* * * * *